(12) United States Patent
Burts, III

(10) Patent No.: US 6,939,833 B2
(45) Date of Patent: Sep. 6, 2005

(54) ADDITIVE FOR, TREATMENT FLUID FOR, AND METHOD OF PLUGGING A TUBING/CASING ANNULUS IN A WELL BORE

(76) Inventor: Boyce Donald Burts, III, 200 Southern Pines, Lafayette, LA (US) 70508

( * ) Notice: Subject to any disclaimer, the term of this patent is extended or adjusted under 35 U.S.C. 154(b) by 256 days.

(21) Appl. No.: 10/211,938

(22) Filed: Aug. 1, 2002

(65) Prior Publication Data

US 2004/0023813 A1 Feb. 5, 2004

(51) Int. Cl.$^7$ .............................................. E21B 33/13
(52) U.S. Cl. .................... 507/225; 507/203; 507/204; 507/268; 507/269; 507/271; 507/264; 507/261; 507/903; 166/295; 166/300
(58) Field of Search ................... 166/295, 300; 507/203, 204, 209, 211–217, 224, 225, 219, 221, 261, 264, 268, 269, 271, 903

(56) References Cited

U.S. PATENT DOCUMENTS

| | | | | |
|---|---|---|---|---|
| 3,727,688 A | * | 4/1973 | Clampitt | 166/283 |
| 3,730,273 A | | 5/1973 | Wilson | 166/269 |
| 3,955,998 A | * | 5/1976 | Clampitt et al. | 252/8.05 |
| 3,971,440 A | | 7/1976 | Hessert et al. | 166/270 |
| 4,009,755 A | | 3/1977 | Sandiford | 166/270 |
| 4,043,921 A | * | 8/1977 | Hessert et al. | 507/113 |
| 4,069,869 A | | 1/1978 | Sandiford | 166/270 |
| 4,275,788 A | | 6/1981 | Sweatman | 166/292 |
| 4,566,979 A | * | 1/1986 | Githens | 507/203 |
| 5,947,644 A | | 9/1999 | Gibbons | 405/267 |
| 6,016,869 A | * | 1/2000 | Burts, Jr. | 166/295 |
| 6,016,871 A | * | 1/2000 | Burts, Jr. | 166/300 |
| 6,016,879 A | * | 1/2000 | Burts, Jr. | 175/72 |
| 6,098,712 A | * | 8/2000 | Burts, Jr. | 166/295 |
| 6,102,121 A | * | 8/2000 | Burts, Jr. | 166/295 |
| 6,218,343 B1 | * | 4/2001 | Burts, Jr. | 507/225 |

* cited by examiner

*Primary Examiner*—Philip C. Tucker
(74) *Attorney, Agent, or Firm*—Gilbreth & Associates, P.C.; J. M. (Mark) Gilbreth; Mary A. Gilbreth

(57) ABSTRACT

For tubing/casing annulus plug treatment to plug a well, a tubing/casing annulus plug additive including a dry mixture of water soluble crosslinkable polymer, a crosslinking agent, a filter aid, and an optional reinforcing material, preferably of fibers and/or comminuted plant materials. The method of forming a tubing/casing annulus plug fluid includes contacting the additive with water or an aqueous solution, with a method of plugging the tubing/casing annulus of a well further including the step of injecting the fluid into the annulus.

40 Claims, No Drawings

ADDITIVE FOR, TREATMENT FLUID FOR, AND METHOD OF PLUGGING A TUBING/CASING ANNULUS IN A WELL BORE

BACKGROUND OF THE INVENTION

1. Field of the Invention

The present invention relates to tubing/casing annulus plug additives and to methods of making such additives, to tubing/casing annulus plug treatment fluids made therefrom and to methods of making such fluids, to methods of modifying a well fluid using such additives and/or fluids, to methods of operating a well using such additives and/or fluids, and to methods of plugging a tubing/casing annulus in a well bore. In another aspect, the present invention relates to tubing/casing annulus plug additives comprising polymer, crosslinking agent, filter aid, and optionally reinforcing materials and to methods of making such additives, to tubing/casing annulus plug treatment fluids made therefrom and to methods of making such fluids, to methods of modifying a well fluid using such additives and/or fluids, to methods of operating a well using such additives and/or fluids, and to methods of plugging a tubing/casing annulus in a well bore. In another aspect, the present invention relates to tubing/casing annulus plug additives comprising a dry mixture of polymer, crosslinking agent, filter aid, and optionally reinforcing materials and to methods of making such additives, to tubing/casing annulus plug treatment fluids made therefrom and to methods of making such fluids, to methods of modifying a well fluid using such additives and/or fluids, to methods of operating a well using such additives and/or fluids, and to methods of plugging a tubing/casing annulus in a well bore. In even another aspect, the present invention relates to additives comprising polymer and diatomaceous earth ("DE") and to methods of making such additives, to tubing/casing annulus plug treatment fluids made therefrom and to methods of making such fluids, to methods of modifying a well fluid using such additives and/or fluids, to methods of operating a well using such additives and/or fluids, and to methods of plugging a tubing/casing annulus in a well bore.

2. Description of the Related Art

Portland cement is commonly used in oil field applications such as oil well cement jobs. Portland cements can be tailor-made for the specific conditions of each well. A description of the state of the art in oil well cementing technology is given in Basic Cementing, Petroleum Publishing Co., 1977 (reprinted from a series of articles appearing in the Oil and Gas Journal) and Rike, J. L., et al, Squeeze Cementing: State of The Art, Journal of Petroleum Technology, (January 1982), pp. 37–45.

Formulation of the cement in the field is largely a product of trial and error by field personnel to meet irregularities in the cementing composition and the downhole environment. Cement quality control is difficult to achieve under such conditions. As a result, Portland cement can exhibit premature set-up, cracking, or shrinking upon curing. This feature of Portland cement limits its usefulness in wellbore treatments to repair leaks in wellbore casing or tubing by plugging the tubing/casing pair annulus. Use of other available methods to remedy leaking wellbore tubulars, including workovers and redrilling, can be extremely cumbersome and expensive.

U.S. Pat. No. 4,730,674, issued Mar. 15, 1988 to Burdge et al., noted that a wellbore treatment process was needed for preventing or repairing leaking tubulars which was both economically and operationally attractive. Burdge et al. further noted that a process was needed which effectively employed a plugging material having a broad range of highly controllable and predictable set-up times for ease of operation and design. Burdge et al. even further noted that a process was needed which employed a plugging material which was not as susceptible as Portland cement to shrinking and cracking when applied to a tubing/casing annulus in a wellbore.

In an effort to overcome the deficiencies of the prior art and to fulfill the perceived needs, U.S. Pat. No. 4,730,674 discloses the use of a water soluble carboxylate crosslinking polymer along with a chromic carboxylate complex crosslinking agent in the plugging of a tubing/casing annulus in a wellbore, and at column 2, lines 30–35, specifically teaches away from the use of solids in the plugging fluid injected into the wellbore.

Thus, while U.S. Pat. No. 5,377,760, issued Jan. 3, 1995 to Merrill discloses addition of fibers to an aqueous solution of partially hydrolyzed polyacrylamide polymer, with subsequent injection into the subterranean to improve conformance, the performance requirements of conformance improvement treatment polymers are so different from those of polymers for plugging an abandoned well, that such would not necessarily work for plugging tubing/casing annulus. Furthermore, Burdge et al. teach away from injection a solid containing polymer into the wellbore to plug a tubing/casing annulus.

Additionally, Merrill's conformance treatment method of mixing the fibers with the polymer solution followed by injection, requires a multiplicity of storage and mixing tanks, and a metering system which must be operated during the operation of the well. Specifically, a first tank will store a water and polymer solution, a second tank will store a water and cross-linking solution, and a third tank will be used to mix fibers with polymer solution from the first tank to create a polymer/fiber slurry. This polymer/fiber slurry is then metered from the third tank and combined with crosslinking solution metered from the second tank to the well bore.

As an advance over the above prior art, U.S. Pat. No. 6,218,343, issued Apr. 17, 2001, to Boyce D. Burts, Jr., for "Additive for, treatment fluid for, and method of plugging a tubing/casing annulus in a well bore," discloses an additive including a dry mixture of water soluble crosslinkable polymer, a crosslinking agent, and a reinforcing material of fibers and/or comminuted plant materials. The method of forming a fluid includes contacting the additive with water or an aqueous solution, with a method of treating the formation further including the step of injecting the fluid into the formation.

While not believed to be related prior art because they relate to different types of well operations, for completeness, attention is directed to five other similar "dry mixture" patents by Boyce D. Burts, Jr., which were filed on the same day (Oct. 31, 1997) as the '343 Patent: U.S. Pat. No. 6,102,121, issued Aug. 15, 2000, for "Conformance improvement additive, conformance treatment fluid made therefrom, method of improving conformance in a subterranean formation," U.S. Pat. No. 6,098,712, issued Aug. 8, 2000, for "Method of plugging a well," U.S. Pat. No. 6,016,879, issued Jan. 25, 2000, for "Lost circulation additive, lost circulation treatment fluid made therefrom, and method of minimizing lost circulation in a subterranean formation," U.S. Pat. No. 6,016,871, issued Jan. 25, 2000, for "Hydraulic fracturing additive, hydraulic fracturing treatment fluid made therefrom, and method of hydraulically fracturing a subterranean formation," and U.S. Pat. No. 6,016,869, issued Jan. 25, 2000, for "Well kill additive, well kill treatment fluid made therefrom, and method of killing a well."

A number of patents discuss the use of diatomaceous earth ("DE") in a well operation.

U.S. Pat. No. 3,380,542, issued Apr. 30, 1968 to Clear, for restoring lost circulation discloses a oil-based drilling fluid, containing a slurry of diatomite and asbestos, used to restore lost circulation during well drilling operations.

U.S. Pat. No. 4,369,844, issued Jan. 25, 1983 to Clear, discloses that various formation sealing agents have been used in the art to form formation seals and/or filter cakes on the wall of a well bore, including diatomaceous earth.

U.S. Pat. No. 4,110,225, issued Aug. 29, 1978 to Cagle, discloses that zones of lost circulation and other undesired fluid communication channels into a wellbore are sealed by isolating a volume in the well including such a zone and applying greater than formation pressure to a novel slurry spotted in the zone until it hardens into a solid, drillable seal. The slurry contains per barrel from 5–50 pounds diatomaceous mix, from about 35 to about 350 pounds of oil well cement, and at a minimum about 5 to 6 pounds of a flake type lost-circulation agent. This '225 patent cites a number of patents that disclose cement/diatomaceous earth compositions, including U.S. Pat. Nos. 2,585,336; 2,793, 957; 2,961,044; 3,467,198; and 3,558,335.

Regarding these patents, the '225 patent notes the following:

Regarding U.S. Pat. No. 2,585,336, the '225 patent notes, "a mixture is made using from 2% to 100% diatomaceous earth, compared to the content of the cement in the slurry. The aim of the inventors was to prevent perlite from settling and to produce a lightweight cement. The diatomaceous earth-cement described in the disclosure is a mixture of Portland cement, perlite and diatomaceous earth, lime, and asbestos fibers."

Regarding U.S. Pat. No. 2,793,957, the '225 patent notes, "refers to a highly permeable cement formed by use of the same basic mixtures of diatomaceous earth with Portland cement, the diatomaceous earth present being from five to seven times the proportion of the Portland cement in the slurry. The aim of the inventors was to produce a light highly permeable cement, entirely opposite to the purpose of my invention."

Regarding U.S. Pat. No. 2,961,044, the '225 patent notes, "discusses and claims a cement composition which has diatomaceous earth in the amounts of from 30% to 70% of the Portland cement. The reason for using the diatomaceous earth was to prevent the strength retrogression of a salt-saturated cement. Thus, while Shell wishes (among other uses) to employ his mixture for squeeze cementing, he produces a relatively high-strength cement plug. There is a real tendency when redrilling such a plug for the bit to be deflected or sidetracked so that the new hole is beside rather than through the bore and the seal is ineffective. This is completely different from my invention which minimizes such tendency by producing a plug at least as drillable as the formation in which it is set. Also, Shell is directed to operations using salt-saturated cement slurries, while I prefer using a fresh or brackish water slurry. I employ lost-circulation agents; he makes no teaching of using such additives. Accordingly, his teaching is quite far from mine."

Regarding both U.S. Pat. Nos. 3,467,198 and 3,558,335, the '225 patent notes, "describe cement compositions having diatomaceous mix present in the amounts from 0.5% to 10% of the amount of Portland cement present to prevent solids-settling."

U.S. Pat. No. 4,369,844, issued Jan. 25, 1983 to Clear, discloses slurries to seal permeable earth formations encountered in the drilling of wells, comprising finely divided paper, diatomaceous earth, and in a further embodiment, lime. A slug of the slurry is spotted at the locus of the permeable formation and defluidized to form a formation seal on which a mud sheath is then deposited.

U.S. Pat. No. 4,505,751, issued Mar. 19, 1985, discloses a silicate/silica cement in oil field applications, including diatomaceous earth as a species of silica compound.

While not believed to be analogous prior art because it relates to earthen pits (for example a ditch) and not to subterrean wellbores nor well operations, U.S. Pat. No. 5,947,644, issued Sep. 7, 1999 to Gibbons et al., is included herein for completeness because it discloses a gelable slurry of aqueous solvent, a crosslinkable polymer, a crosslinking agent, and unconsolidated solids such as diatomaceous earth. This gelable slurry is placed in an earthen pit and allowed to form into a fluid impermeable barrier wall in the earthen pit. The polymer serves to bind the unconsolidated solids to convert the gelable slurry to a non-deformable gelled continuum of consolidated solids, which forms the barrier wall in the earthen pit. As disclosed in the '644 patent in the Summary of the Invention section, at col. 1, lines 57–67, this gelable slurry is prepared by first forming a liquid gelation solution of the polymer and crosslinking agent, to which is subsequently mixed with the unconsolidated solids, or alternatively, by sequentially mixing the aqueous solvent, crosslinkable polymer, and polymer crosslinking agent with the unconsolidated solids.

Thus, in spite of the advancements in the prior art, there still need for further innovation in the tubing/casing annulus plug additives.

There is need for further innovation for tubing/casing annulus plug additives utilizing a water soluble polymer.

There is another need for a tubing/casing annulus plug additive which would allow for simplification of the mixing equipment.

These and other needs in the art will become apparent to those of skill in the art upon review of this specification, including its drawings and claims.

SUMMARY OF THE INVENTION

It is an object of the present invention to provide for further innovation in tubing/casing annulus plug additives.

It is an another object of the present invention to provide for further innovation for tubing/casing annulus plug additives utilizing a water soluble polymer.

It is even another object of the present invention to provide for a tubing/casing annulus plug additive which would allow for simplification of the mixing equipment.

These and other objects of the present invention will become apparent to those of skill in the art upon review of this specification, including its drawings and claims.

According to one embodiment of the present invention, there is provided a tubing/casing annulus plug additive comprising a dry mixture of water soluble crosslinkable polymer, a crosslinking agent, and a filter aid.

According to another embodiment of the present invention, there is provided a well fluid comprising a tubing/casing annulus plug fluid, water soluble crosslinkable polymer, a crosslinking agent, and a filter aid.

According to even another embodiment of the present invention, there is provided a method of modifying a tubing/casing annulus plug fluid. The method includes contacting the tubing/casing annulus plug fluid with a water soluble crosslinkable polymer, crosslinking agent, and filter aid to form a modified tubing/casing annulus plug fluid.

According to still another embodiment of the present invention, there is provided a method for plugging a tubing/casing annulus formed between a casing and a tube internal to the casing in a wellbore in fluid communication with a subterranean hydrocarbon-bearing formation. The method includes providing a tubing/casing annulus plug fluid comprising water soluble crosslinkable polymer, a crosslinking agent, and a filter aid. The method also includes injecting the tubing/casing annulus plug fluid into the annulus. The method also includes dewatering the fluid to form a filter aid plug, and to form a dewatered fluid which subsequently crosslinks to substantial completion in said annulus to substantially plug said annulus.

According to yet another embodiment of the present invention, there is provided a method for plugging a tubing/casing annulus formed between a casing and a tube internal to the casing in a wellbore in fluid communication with a subterranean hydrocarbon-bearing formation. The method includes providing a tubing/casing annulus plug fluid comprising water soluble crosslinkable polymer, a crosslinking agent, and filter aid. The method includes injecting the tubing/casing annulus plug fluid into the annulus. The method includes applying pressure to dewater the fluid to form a filter aid plug, and to form a dewatered fluid which subsequently crosslinks to substantial completion in said annulus to substantially plug said annulus.

According to even still another embodiment of the present invention, there is provided a method of circulating a tubing/casing annulus plug fluid in a welbore penetrating a subterranean formation. The method includes providing a tubing/casing annulus plug fluid comprising water or an aqueous solution, water soluble crosslinkable polymer, a crosslinking agent, and a filter aid. The method includes circulating the tubing/casing annulus plug fluid in the wellbore.

According to even yet another embodiment of the present invention, there is provided a method of modifying a tubing/casing annulus plug fluid circulating in a wellbore penetrating a subterranean formation. The method includes introducing a water soluble crosslinkable polymer, crosslinking agent, and filter aid to the circulating tubing/casing annulus plug fluid.

Various further embodiments of any or all of the above embodiments include any or all of the following in any combination: the filter aid is selected from the group consisting of diatomaceous earth, perlite, glass beads, magnesium silicate, solid thermoplastic or thermoset polymer beads, talc, and calcium silicate; or the polymer is an a carboxylate-containing polymer, and the crosslinking agent is selected from the group consisting of chromium (III) carboxylate complexes, aldehydes, dialdehydes, formaldehydes, glutaraldehyde, dichromates, titanium chelates, phenols, substituted phenols, ethers, aluminum citrate, and aluminates; the filter aid comprises at least one of diatomaceous earth or pearlite; the polymer comprises a low molecular weight polymer having a molecular weight less than 500,000, and a high molecular weight polymer having a molecular weight of at least 500,000; the polymer is a water soluble, carboxylate containing acrylamide, and the crosslinking agent is a chromium (III) carboxylate complex; the filter aid is diatomaceous earth; the filter aid is pearlite; the reinforcing material selected from the group consisting of hydrophilic fibers, hydrophobic fibers, and comminuted plant material; and/or various weight percentages are in the range of about 4 to about 35 weight percent polymer, in the range of about 1 to about 10 weight percent cross linking agent, and in the range of about 55 to about 95 weight percent filter aid, based on the total weight of the polymer, cross linking agent and filter aid.

These and other embodiments of the present invention will become apparent to those of skill in the art upon review of this specification and claims.

DETAILED DESCRIPTION OF THE INVENTION

The tubing/casing annulus plug additive of the present invention includes polymer, cross-linking agent, filter aid, and optionally reinforcing materials, preferably for example either fibers or comminuted particles of plant materials, and optionally any other materials that are known in the art. In a preferred embodiment of the present invention, the tubing/casing annulus plug additive is a dry mixture of polymer, crosslinking agent, and filter aid, and optionally reinforcing materials.

The present invention provides a wellbore treatment additive, fluid and process for plugging a tubing/casing annulus in a wellbore in communication with a subterranean hydrocarbon-bearing formation. The process is particularly applicable to injection or production wells in oil fields wherein the tubing and/or casing have developed leaks which enable undesirable flow of fluids into, out of, or vertically through the annulus formed between the tubing/casing pair. Leaks in the tubing and/or casing can be caused inter alia by corrosion, mechanical abrasion or thread leaks.

The leaks can result in serious operational, safety and/or environmental problems, especially where brines leak into and fill the annulus between the tubing/casing pair. The brines cause severe corrosion of the metal materials in the wellbore which ultimately can lead to loss of the well.

The present invention prevents the unwanted vertical flow of fluids in the tubing/casing annulus as well as unwanted flow of fluids into or out of leaking tubing and/or casing in a cost-effective and operationally attractive manner. The process is applicable as a remedial treatment for existing leaking wells and as a preventive treatment for new or non-leaking wells.

The objectives of the present invention are achieved by means of a plugging material comprising a tailor-made crosslinked polymer gel.

"Gel" as used herein is directed to a continuous three-dimensional crosslinked polymeric network having an ultra high molecular weight. The gel contains a liquid medium such as water which is confined within the solid polymeric network. The fusion of a liquid and a solid component into a single-phase system provides the gel with a unique phase behavior. Gels employed by the present invention have sufficient structure so as not to propagate from the confines of a plugged volume into a less permeable region of the formation adjoining the volume when injected into the volume.

"Plugging" is a substantial reduction in permeability of a volume in the wellbore sufficient to prevent or inhibit fluid flow therethrough.

"Partially gelled" solutions are also referred to herein. A partially gelled solution is at least somewhat more viscous than an uncrosslinked polymer solution such that it is incapable of entering a less permeable region where no treatment is desired, but sufficiently fluid such that it is capable of displacement into a desired treatment zone. The crosslinking agent of the partially gelled solution has reacted incompletely with the polymer with the result that neither all of the polymer nor all of the crosslinking agent in the gelation solution is totally consumed by the crosslinking reaction. The partially gelled solution is capable of further crosslinking to completion resulting in the desired gel without the addition of more crosslinking agent.

"Crosslinked to completion" means that the gel composition is incapable of further crosslinking because one or both of the required reactants in the initial solution are consumed. Further crosslinking is only possible if either polymer, crosslinking agent, or both are added to the gel composition.

The preferred gel of the present invention contains a high molecular weight, water-soluble carboxylate-containing polymer, and a chromic carboxylate complex crosslinking agent, and optionally reinforcing material such as the preferred fibers and/or comminuted plant material.

The gel is generally prepared by forming in any order, by any suitable method and with type of equipment, a uniform gelation solution of the polymer, crosslinking agent, and fibers and/or comminuted plant material. In a preferred embodiment, the gel is prepared by contacting a dry mixture of the polymer, crosslinking agent and fibers and/or comminuted plant material, with water or an aqueous solution.

Once the solution is formed, the method of the present invention includes injecting the solution into the annulus between a tubing/casing pair in a wellbore penetrating a hydrocarbon-bearing formation. The gelation solution is gelled to substantial completion in the annulus thereby plugging the annulus.

The gelation solution may be advantageously designed to be at least partially gelled by the time it reaches the annulus to inhibit or prevent its propagation into a less permeable material, which may adjoin the casing where no plugging is desired, such as a formation matrix. The gelation solution sets up in the annulus without requiring the further injection of any additional components. The gel is a continuous single-phase material which substantially plugs the annulus. After the treatment, the well may be returned to normal operation.

The process provides distinct advantages over processes known in the art. The gelation solution, as initially injected into the well-bore, is a uniform nonviscous liquid solution prepared at the surface. The resulting gel forms a tenacious chemical bond with the tubular surfaces and is substantially impermeable to formation fluids. The gel is designed to be non-flowing to the maximum rheological stress of the system, which enables it to substantially resist displacement from the annulus during oil recovery operations. Yet, the gel is not so strong that placement of the gel in the annulus precludes subsequent tube pulling or workover operations in the wellbore. The gel is substantially permanent and resistant to degradation in the subterranean environment. However, if subsequent removal of the gel from the annulus is desired, it can be dissolved by an external solvent, such as solutions of sodium hypochlorite, hydrogen peroxide, or any other suitable peroxo compound.

The cementing gel employed in the present invention possesses a broad range of highly controllable and predictable set-up times and strengths. The process is applicable to a broad range of temperatures, salinities, rock formations, and environments. The practitioner can customize or tailor a gel for specific operational constraints, downhole characteristics and subsequent performance demands. One can predetermine the gelation rate and resultant gel strength and stability which are required of a gel to meet the performance demands in the wellbore. Thereafter, a cementing gel having the required predetermined properties is produced under controlled conditions at the surface by utilizing observed correlations between specific controllable gelation parameters and resultant gel properties.

A well fluid of the present invention includes well fluid components plus the additive of the present invention.

Any suitable relative amounts of the polymer, crosslinking agent, filter aid and the optional reinforcing materials may be utilized in the present invention provided that the desired conformance results are achieved. Generally, the relative amounts of each will be determined based on the particular application to which the additive is to be subjected. A suitable amount of crosslinking agent is provided to reach the desired amount of crosslinking. The amount of reinforcing material is selected to provide desired physical properties.

Any suitable types of filter aid materials as are known in the filtration art may be utilized as the filter aid component in the present invention. All that is necessary is that the filter aid will function to be "squeezed" and allow migration of the solution of polymer and crosslinking agent into the formation, and will form a plug of the filter aid that will hold the solution in place until it sufficiently crosslinks. Non-limiting examples of which include diatomaceous earth ("DE" or diatomite), perlite (or pearlite), glass beads, magnesium silicate, solid thermoplastic or thermoset polymers generally in powder form, talc (naturally occuring form of hydrous magnesium silicate containing varying proportions of such associated minerals as alpha-quartz, calcite, chlorite, dolomite, kaolin, magnesite, and phlogopite), and calcium silicate (for example, see, U.S. Pat. No. 5,750,038, issued May 12, 1998, to Tsunematsu, for "Method for the preparation of acid-resistant calcium silicate," incorporate herein by reference), and any combination of two or more of the above. Preferably, the filter aid is selected from the group consisting of diatomaceous earth perlite (or pearlite), magnesium silicate, and talc. More preferably, the filter aid is a mineral based type of filter aid, non-limiting examples of which include diatomaceous earth, pearlite, magnesium silicate, talc and calcium silicate, and any combination of two or more of the above. Even more preferably, the filter aid comprises pearlite and/or diatomaceous earth. Still more preferably, the filter aid comprises diatomaceous earth.

The amount of filter aid to be utilized is generally not dependent upon the amount of polymer or crosslinking agent, but rather, is that amount sufficient to form a plug to retain the polymer in place until it crosslinks sufficiently to remain in place on its own. However, in an effort to quantify the amount of filter aid, a weight ratio of filter aid to polymer is provided for convenience.

Generally, the weight ratio of filter aid:polymer in the additive is in the range of about 100:1 to about 1:100, preferably in the range of about 50:1 to about 1:50, more preferably in the range of about 15:1 to about 1:15, even more preferably in the range of about 5:1 to about 1:5, and still more preferably in the range of about 5:1 to about 1:1.

Commercially, it is envisioned that the additive will be packaged in a single bag, to promote ease of use and eliminate the necessity of any measuring and/or mixing at the well site. As a non-limiting example of a commercial embodiment, a 40 pound bag might contain any where from about 1.5 to about 17.5 lbs. polymer, from about 0.4 to about 5 lbs. crosslinking agent, and the balance of from about 17.5 to about 38.1 lbs. filter aid.

In weight percentage terms, examples of weight percentage ranges include from about 4 to about 35 weight percent polymer, from about 1 to about 10 weight percent cross linking agent, and from about 55 to about 95 weight percent filter aid, based on the total weight of the polymer, cross linking agent and filter aid. Specific non-limiting examples of useful compositions include 4% polymer, 1% cross linker, 95% DE, or 24% polymer, 6% cross linker, 70% DE, or 35% polymer, 10% cross linker, 55% DE.

The particle size distribution of the filter aid is selected to allow dewatering of the filter aid (i.e., the solution containing polymer and crosslinking agent will separate from the filter aid), and to allow formation of a plug of the filter aid that retains the polymer and crosslinking agent in the reservoir during crosslinking. It is believed that the particle size distribution will be determined by the reservoir conditions.

Other additives as are known in the well fluid art may be utilized, non limiting examples of which include surfactants, dispersants, retarders, accelerants, weighting agents (such as hematite, barite or calcium carbonate), lost circulation materials and other additives may be provided as necessary or desired.

The polymer utilized in the practice of the present invention is preferably water soluble and must be capable of being pumped as a liquid and subsequently crosslinked in place to form a substantially non-flowing crosslinked polymer which has sufficient strength to withstand the pressures exerted on it. Optionally, when reinforcing materials are utilized, it would have a network structure capable of incorporating reinforcing materials.

While any suitable water soluble polymer may be utilized, the preferred polymer utilized in the practice of the present invention is a water soluble carboxylate-containing polymer, more preferably a water soluble partially hydrolyzed carboxylate-containing polymer. This carboxylate-containing polymer may be any crosslinkable, high molecular weight, water-soluble, synthetic polymer or biopolymer containing one or more carboxylate species.

For an example of polymers and crosslinking agents suitable for use herein and details regarding their making and use, please see any of the above listed patents to Boyce D. Burts, Jr. all herein incorporated by reference, or please see U.S. Pat. Nos. 4,683,949, 4,723,605, 4,744,418, 4,770,245, 4,844,168, 4,947,935, 4,957,166 and 4,989,673, 5,377,760, 5,415,229, 5,421,411, all herein incorporated by reference.

The average molecular weight of the carboxylate-containing polymer utilized in the practice of the present invention is in the range of about 10,000 to about 50,000,000, preferably in the range of about 100,000 to about 20,000,000, more preferably in the range of about 200,000 to about 15,000,000, and still more preferably in the range of about 200,000 to about 10,000,000.

In some instances, a blend of two polymers, a lower molecular weight polymer and a higher molecular weight polymer may be utilized. For example, in some instances where high fluid loss is encountered, such as a hole in the casing, a fault zone, loose sand, unconsolidated zones, or vugular formations, higher molecular weight polymer must be utilized. However, this higher molecular weight polymer causes problems in mixing, pumping and total polymer load. Thus, this higher molecular weight polymer is mixed with a lower molecular weight polymer to provide mixing, pumping and loading as desired.

Generally, this lower molecular weight polymer has a molecular weight less than 1,000,000, preferably less than 500,000, and more preferably less than 200,000. Generally the lower molecular weight polymer will have a molecular weight in the range of about 20,000 to less than 1,000,000, preferably in the range of about 20,000 to less than 500,000, and more preferably in the range of about 200,000 to less than 500,000. The higher molecular weight polymer generally has a molecular weight of at least 1,000,000, preferably from about 1,000,000 to about 50,000,000, more preferably from about 5,000,000 to about 20,000,000, and even more preferably from about 6,000,000 to about 12,000,000.

Biopolymers useful in the present invention include polysaccharides and modified polysaccharides. Non-limiting examples of biopolymers are xanthan gum, guar gum, carboxymethylcellulose, o-carboxychitosans, hydroxyethylcellulose, hydroxypropylcellulose, and modified starches. Non-limiting examples of useful synthetic polymers include acrylamide polymers, such as polyacrylamide, partially hydrolyzed polyacrylamide and terpolymers containing acrylamide, acrylate, and a third species. As defined herein, polyacrylamide (PA) is an acrylamide polymer having substantially less than 1% of the acrylamide groups in the form of carboxylate groups. Partially hydrolyzed polyacrylamide (PHPA) is an acrylamide polymer having at least 1%, but not 100%, of the acrylamide groups in the form of carboxylate groups. The acrylamide polymer may be prepared according to any conventional method known in the art, but preferably has the specific properties of acrylamide polymer prepared according to the method disclosed by U.S. Pat. No. Re. 32,114 to Argabright et al incorporated herein by reference.

Any crosslinking agent suitable for use with the selected polymer may be utilized in the practice of the present invention. Non limiting examples of suitable crosslinking agents includes chromium (III) carboxylate complexes, aldehydes, dialdehydes, formaldehydes, glutaraldehyde, dichromates, titanium chelates, phenols, substituted phenols, ethers, aluminum citrate, and aluminates.

Preferably, the crosslinking agent utilized in the present invention is a chromic carboxylate complex.

The term "complex" is defined herein as an ion or molecule containing two or more interassociated ionic, radical or molecular species. A complex ion as a whole has a distinct electrical charge while a complex molecule is electrically neutral. The term "chromic carboxylate complex" encompasses a single complex, mixtures of complexes containing the same carboxylate species, and mixtures of complexes containing differing carboxylate species.

The chromic carboxylate complex useful in the practice of the present invention includes at least one or more electropositive chromium III species and one or more electronegative carboxylate species. The complex may advantageously also contain one or more electronegative hydroxide and/or oxygen species. It is believed that, when two or more chromium III species are present in the complex, the oxygen or hydroxide species may help to bridge the chromium III species. Each complex optionally contains additional species which are not essential to the polymer crosslinking function of the complex. For example, inorganic mono- and/or divalent ions, which function merely to balance the electrical charge of the complex, or one or more water molecules may be associated with each complex. Non-limiting representative formulae of such complexes include:

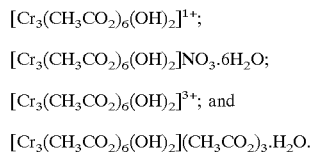

[Cr$_3$(CH$_3$CO$_2$)$_6$(OH)$_2$]$^{1+}$;

[Cr$_3$(CH$_3$CO$_2$)$_6$(OH)$_2$]NO$_3$·6H$_2$O;

[Cr$_3$(CH$_3$CO$_2$)$_6$(OH)$_2$]$^{3+}$; and

[Cr$_3$(CH$_3$CO$_2$)$_6$(OH)$_2$](CH$_3$CO$_2$)$_3$·H$_2$O.

"Trivalent chromium" and "chromic ion" are equivalent terms encompassed by the term "chromium III" species as used herein.

The carboxylate species are advantageously derived from water-soluble salts of carboxylic acids, especially low molecular weight mono-basic acids. Carboxylate species derived from salts of formic, acetic, propionic, and lactic acid, substituted derivatives thereof and mixtures thereof are preferred. The preferred carboxylate species include the following water-soluble species: formate, acetate, propionate, lactate, substituted derivatives thereof, and mixtures thereof. Acetate is the most preferred carboxylate species. Examples of optional inorganic ions include sodium, sulfate, nitrate and chloride ions.

A host of complexes of the type described above and their method of preparation are well known in the leather tanning art. These complexes are described in Shuttleworth and Russel, Journal of the Society of Leather Trades' Chemists, "The Kinetics of Chrome Tannage Part I.," United Kingdom, 1965, v. 49, p. 133–154; "Part III.," United Kingdom, 1965, v. 49, p. 251–260; "Part IV.," United Kingdom, 1965, v. 49, p. 261–268; and Von Erdman, Das Leder, "Condensation of Mononuclear Chromium (III) Salts to Polynuclear Compounds," Eduard Roether Verlag, Darmstadt Germany, 1963, v. 14, p. 249; and incorporated herein by reference. Udy, Marvin J., Chromium. Volume 1: Chemistry of Chromium and its Compounds. Reinhold Publishing Corp., N.Y., 1956, pp. 229–233; and Cotton and Wilkinson, Advanced Inorganic Chemistry 3rd Ed., John Wiley and Sons, Inc., N.Y., 1972, pp. 836–839, further describe typical complexes which may be within the scope of the present invention and are incorporated herein by reference. The present invention is not limited to the specific complexes and mixtures thereof described in the references, but may include others satisfying the above-stated definition.

Salts of chromium and an inorganic monovalent anion, e.g., CrCl3, may also be combined with the crosslinking agent complex to accelerate gelation of the polymer solution, as described in U.S. Pat. No. 4,723,605 to Sydansk, which is incorporated herein by reference.

The molar ratio of carboxylate species to chromium III in the chromic carboxylate complexes used in the process of the present invention is typically in the range of 1:1 to 3.9:1. The preferred ratio is range of 2:1 to 3.9:1 and the most preferred ratio is 2.5:1 to 3.5:1.

The optional reinforcing material of the present invention may comprise fibers or comminuted particles of plant materials, and preferably comprises comminuted particles of one or more plant materials.

Fibers suitable for use in the present invention are selected from among hydrophilic and hydrophobic fibers. Incorporation of hydrophobic fibers will require use of a suitable wetting agent. Preferably, the fibers utilized in the present invention comprise hydrophilic fibers, most preferably both hydrophilic and hydrophobic fibers.

With respect to any particular fiber employed in the practice of the present invention, it is believed that the longer the fiber, the more difficult it is to be mixed uniformly in solution. It is believed that fibers as long as 12,500 microns may tend to aggregate and form clumps. The shorter the fiber, it is believed the easier it is to mix in solution. On the other hand, the shorter the fiber, the greater the quantity necessary to provide the desired level of strength in a reinforced mature gel. In general, the fibers utilized in the present invention will have a length in the range of 100 microns to 3200 microns, preferable 100 microns to 1000 microns.

Non-limiting examples of suitable hydrophobic fibers include nylon, rayon, hydrocarbon fibers and mixtures thereof.

Non-limiting examples of suitable hydrophilic fibers include glass, cellulose, carbon, silicon, graphite, calcined petroleum coke, cotton fibers, and mixtures thereof.

Non-limiting examples of comminuted particles of plant materials suitable for use in the present invention include any derived from: nut and seed shells or hulls such as those of peanut, almond, brazil, cocoa bean, coconut, cotton, flax, grass, linseed, maize, millet, oat, peach, peanut, rice, rye, soybean, sunflower, walnut, wheat; various portions of rice including the rice tips, rice straw and rice bran; crude pectate pulp; peat moss fibers; flax; cotton; cotton linters; wool; sugar cane; paper; bagasse; bamboo; corn stalks; various tree portions including sawdust, wood or bark; straw; cork; dehydrated vegetable matter (suitably dehydrated carbonhydrates such as citrus pulp, oatmeal, tapioca, rice grains, potatoes, carrots, beets, and various grain sorghams); whole ground corn cobs; or various plant portions the corn cob light density pith core, the corn cob ground woody ring portion, the corn cob coarse or fine chaff portion, cotton seed stems, flax stems, wheat stems, sunflower seed stems, soybean stems, maize stems, rye grass stems, millet stems, and various mixtures of these materials.

Optionally a dispersant for the comminuted plant material in the range of about 1 to about 20 pounds, preferably in the range of about 5 to about 10 pounds, and more preferably in the range of about 7 to about 8 pounds of dispersant may be utilized per pound of comminuted plant material. A non-limiting example of a dispersant would be NaCl.

Preferred comminuted materials useful in the practice of the present invention include those derived from peanuts, wood, paper any portion of rice seed or plant, and any portion of corn cobs.

These various materials can be comminuted to very fine particle sizes by drying the products and using hammer mills, cutter heads, air control mills or other comminution methods as is well known to those of skill in the comminution art. Air classification equipment or other means can be used for separation of desired ranges of particle sizes using techniques well-known in the comminution art.

Any suitable size of comminuted material may be utilized in the present invention, along as such size produces results which are desired. Of course, the particle size will be a function of diameter of the porosity passages. While the present invention will find utility for passages on the order of microns in diameter, it will also find utility on larger passages, for example, those with diameters greater than $\frac{1}{64}$, $\frac{1}{16}$ or event $\frac{1}{8}$ of an inch.

In most instances, the size range of the comminuted materials utilized herein will range from below about 8 mesh ("mesh" as used herein refers to standard U.S. mesh), preferably from about −65 mesh to about −100 mesh, and more preferably from about −65 mesh to about −85 mesh. Specifically preferred particle sizes for some materials are provided below.

Preferred mixtures of comminuted materials useful in the practice of the present invention include a rice fraction and peanut hulls; a rice fraction and wood fiber and/or almond hulls; a rice fraction and a corn cob fraction, preferably a chaff portion; and a corn cob fraction, preferably a pith or chaff portion, a rice fraction, and at least one of wood fiber, nut shells, paper and shredded cellophane.

Rice is commercially available in the form of rice hulls, rice tips, rice straw and rice bran, as these various parts of the rice plant are separated commercially and are widely available from rice mills. Preferably, the size range of the rice fraction utilized herein will range from below about 8 mesh ("mesh" as used herein refers to standard U.S. mesh), preferably from about −65 mesh to about −100 mesh, and more preferably from about −65 mesh to about −85 mesh.

After the corn kernals are removed, corn cobs consist of four principle parts that are arranged concentrically. The central portion is a very light density pith core, that is surrounded by a woody ring, that in turn is surrounded by a coarse chaff portion, that in turn is covered by a fine chaff portion. The coarse and fine chaff portions form the sockets for ancoring the corn kernels to the corncob. The normal methods of grinding corncobs produce a mixture of all four parts enumerated above. It is possible, however, to separate the woody ring material from the remainder of the cob. The chaff portion of the corncob remaining after removal of the woody ring material is known as "bees wings". In the present invention, any of the pith or chaff portions ("BPC") are the preferred portions of the corn cob, with the chaff portions being more preferred. A range of particle sizes of pith and chaff can be obtained from comminution, but the size range smaller than about 8 mesh is suitable for this invention. Preferably, a particle size distribution ranging from smaller than 8 mesh to smaller than 100 mesh is utilized.

Preferred woods for use as comminuted materials in the present invention include any type of hard wood fiber, including cedar fiber, oak fiber, pecan fiber and elm fiber. Preferably the wood fiber comprises cedar fibers.

Preferred nut shells for use in the present invention include pecan, walnut, and almond. Preferably, the nut shells comprise at least one of pecan or walnut shells.

Preferred particle sizes for the wood fibers, nut shells, paper and cellophane will generally range from about +10 mesh to −100 mesh. An illustration of a non-limiting particle size distribution for these materials would include particles of +10 mesh, +20 mesh, +30 mesh, +50 mesh, +60 mesh, +100 mesh, and −100 mesh.

For one of the preferred comminuted plant mixtures comprising a corn cob fraction, a rice fraction, and at least one of wood fiber, nut shells, paper and shredded cellophane, the mixture will generally comprise in the range of about 5 to about 95 weight percent rice, in the range of about 5 to about 95 weight percent corncob pith or chaff, with the total of ground wood fiber, ground nut shells, ground paper and shredded cellophane comprising in the range of about 5 to about 95 weight percent (weight percent based on the total weight of plant material in the mixture. Preferred ranges are about 20 to about 75 weight percent rice, about 5 to about 35 weight percent corncob pith or chaff, with the total of ground wood fiber, ground nut shells, ground paper and shredded cellophane comprising in the range of about 20 to about 75 weight percent. More preferred ranges are about 30 to about 50 weight percent rice, about 10 to about 30 weight percent corncob pith and chaff, with the total of ground wood fiber, ground nut shells, ground paper and shredded cellophane comprising in the range of about 25 to about 50 weight percent.

As these comminuted materials are to be added to a water base conformance fluid, a small amount of oil may optionally added to the mixture. This optional oil is preferably added while the plant materials are being mixed together. This mixing may take place in a ribbon blender, where the oil in the required amount is applied by a spray bar. The oil wets the particles and adds to their lubricity while at the same time helping to control dust produced by the mixing operation. A variety of oils may be utilized in the practice of the present invention in concentrations generally ranging from about 1 percent to about 5 percent by weight based on the total weight of the mixture of comminuted materials, more preferably ranging from about 1 percent to about 2 percent. A non-limiting example of a commercially available oil suitable for use in the present invention includes ISOPAR V, available from Exxon Corporation.

In the method of the present invention for forming a tubing/casing annulus plug additive, the various components of polymer, crosslinking agent and filter aid, may be mixed in any form (dry form, liquid form, or slurry form) in any suitable order utilizing mixing techniques as known to those in the art.

Specifically, a dry tubing/casing annulus plug additive may be formed by mixing solid polymer, solid crosslinking agent and solid filter aid to form a solid (dry) tubing/casing annulus plug additive.

In the practice of the present invention, liquid tubing/casing annulus plug additive may be formed by mixing the various components in any form (dry form or liquid or slurry form) in any suitable order utilizing mixing techniques as know to those in the art. If the various components are mixed in dry form, this dry mixture may subsequently may be contacted with water or aqueous solution to form a liquid tubing/casing annulus plug additive.

Tubing/casing annulus plug fluids are known to those of skill in the art, and would generally be of the category of well fluid known as completion fluids. Generally such fluids are liquids in which a density agent has been included to increase the density of the fluid (generally some type of metal salt), and under certain limited circumstances may optionally also include a solid phase (making it more like a traditional drilling fluid).

In a method of treating a tubing/casing annulus plug fluid, the tubing/casing annulus plug fluid to be treated is contacted with a liquid or solid form of the tubing/casing annulus plug additive of the present invention. Preferably, the tubing/casing annulus plug fluid is contacted with a dry mixture (i.e., solid form) of the tubing/casing annulus plug additive. Of course, the various components of the additive (i.e., polymer, crosslinking agent, and filter aid) may be added individually to the tubing/casing annulus plug fluid to be treated.

A well fluid of the present invention comprises an aqueous component, polymer, crosslinking agent, and filter aid. A modified tubing/casing annulus plug fluid comprises a traditional tubing/casing annulus plug fluid and the tubing/casing annulus plug additive or fluid of the present invention.

In a method of operating a well of the present invention in which a well fluid is circulating down from the surface of the well, through the drill string positioned in a wellbore, and out through openings in the drill bit such that the well fluid is then circulated upwardly in the annulus between the side of the wellbore and the rotating drill string, the present invention includes circulating such a well fluid comprising the tubing/casing annulus plug additive. The tubing/casing annulus plug additive can be added to the circulating fluid in liquid or solid form or of course, the individual components may be added to the circulating fluid in liquid or solid form.

Alternatively, the tubing/casing annulus plug additive may be added to the fluid prior to it being circulated.

In well operation, it is also known to define a vertically limited zone into which a slurry is then pumped and subsequently squeezed by application of pressure (either from the formation itself, or by application of pressure to the zone). In a method of performing a well operation of the present invention, the tubing/casing annulus plug fluid of the present invention is pumped into a desired vertically defined zone in the well, and then "squeezed" to dewater the fluid such that a plug of the filter aid remains behind and the solution of polymer and crosslinking agent migrates into the formation. The filter aid plug remains in place to prevent or slow down the escape of the solution back into the well allowing time for the solution to form a gel plug. In this well operation, one may start with a well fluid containing the polymer, crosslinking agent and filter aid, or these various components may be introduced to the well fluid in any combination/or of one or more in liquid or dry form, or as the additive or tubing/casing annulus plug fluid as discussed above.

The various components of the present invention may be mixed in any suitable order utilizing mixing techniques as known to those in the art, including dry mixing of the various components prior to addition to water, or alternatively, either or both of the polymer and cross-linking agent may be utilized as a solution. Most preferably, the various components are mixed in dry form, and then contacted with water or aqueous solution to form a tubing/casing annulus plug fluid. This tubing/casing annulus plug fluid is then injected into the well as is known in the art.

It is apparent that one can produce gels across a very broad range of gelation rates and gel properties as a function of the gelation conditions. Thus, to effect an optimum plugging job according to the present process, the practitioner predetermines the gelation rate and properties of the resultant gel which meet the demands of the given wellbore and thereafter produces the gel having these predetermined characteristics. The demands of the wellbore include the in situ gelation conditions such as temperature, connate water properties, size of the treatment volume, the pressure drop and permeability of the adjoining matrix as well as the post treatment conditions such as injection and production pressures. Analytical methods known to one skilled in the art are used to determine these demands which provide criteria to predetermine the gelation rate and resultant gel properties in the manner described above and continuing hereafter.

The gelation rate is advantageously sufficiently slow to enable preparation of the gelation solution at the surface and injection of the solution as a uniform slug into the wellbore annulus. Too rapid a gelation rate produces excessive gelation of the solution at the surface which results in a solution that may be difficult, if not impossible, to inject into the annulus to be plugged due to its rheological properties. At the same time, the gelation rate must be sufficiently rapid to enable completion of the reaction within a reasonable period of time so that the well may be activated after the plugging job.

The solution may be substantially ungelled before reaching the annulus. However, at least partial gelation of the solution may be advantageous before the solution reaches the annulus being plugged. Partial gelation prevents the solution from penetrating permeable rock in fluid communication with the annulus. Substantial penetration of permeable rock by the solution and its ensuing permeability reduction may be counterproductive to the plugging of the annulus. The solution advantageously gels to completion in the annulus. The values of the independent variables in the process are carefully selected to achieve a gelation rate meeting these criteria.

The amount of solution injected into the wellbore is a function of the volume of the annulus to be plugged. One skilled in the art can determine the required amount of a gel for a given volume to be plugged. Placement of the gelation solution in the annulus may be facilitated by zone isolation means such as packers and the like.

The injection rate is a function of the gelation rate and operational constraints of injection pressure and pumping limits. The required injection rate is fixed such that all of the solution can be practically injected into the annulus before it becomes unpumpable. The gelation time of the gel ranges from near instantaneous up to 48 hours or longer. Longer gelation times are limited by practical considerations of lost production when injection and production wells are shut in.

Gels having a predetermined gelation rate and resultant gel properties to meet the demands of a given well are produced by adjusting and setting the surface gelation conditions as they correlate to the gelation rate and gel properties. Accordingly the gels are produced in a manner which renders them insensitive to most extreme formation conditions. The gels can be stable at formation temperatures as high as 130° C. or more and at any formation pH contemplated. The gels are relatively insensitive to the stratigraphy of the rock, metal tubulars and other materials and chemicals employed in cementing operations. The gels can be employed in carbonate and sandstone strata and unconsolidated or consolidated strata having varying mineralogy. Once the gels are in place, it is extremely difficult to displace the gels by physical or chemical means other than total destruction of the crosslinked network. The gels may be reversible on contact with hydrogen peroxide or sodium hypochlorite, but are substantially insoluble in the formation fluids.

The process is applicable to most oil field wells having a tubing string within a cased wellbore. The process is employed as a remedial treatment process in wellbores having leaking tubulars to displace unwanted brine from the tubing/casing annulus. The process also prevents the subsequent encroachment of brine into the annulus. The process is further employed as a preventive treatment process in new or non-leaking wellbores to preclude brine from entering the annulus should tubular leaks subsequently develop.

The strength of the gel can vary from an elastic jelly-like material to a rigid rubber-like material depending upon the performance demands of the wellbore. The gel is designed to be sufficiently strong not to flow under the maximum rheological stress encountered in flow conduits of the wellbore. Yet, the gel is advantageously not so strong that the tubing cannot be subsequently pulled after treatment if desired. Pulling of the tubing can be facilitated by initially coating the tubular surfaces to contact the gel with a friction-reducing material, such as Teflon, plastic, or grease, prior to applying the process of the present invention.

Stronger rigid gels are generally preferred where extreme drawdown pressures are encountered during production of a well or where extreme injection pressures are encountered during injection of fluids into a well which could cause a weak gel to fail. PA is often preferred for such formulations because it has a slower gelation rate than PHPA which enables one to inject it into a volume before it sets up.

EXAMPLES

The following examples are provided merely to illustrate some but not all of the embodiments of the present invention, and are not intended to, nor do they, limit the scope of the claims.

DE

The DE utilized in this example was that produced by Eagle Picher Minerals, Inc., and sold under the trademark CELATOM® Diatomite ET-905. As measured, the particle size distribution was:

8%+200 mesh
92%−200 mesh

Polymer

The polymers utilized were obtained from Ciba and a water-soluble, crosslinkable, carboxylate-containing acrylamide polymers, CIBA 254 (MW from 300,000 to less than 500,000) and CIBA 935 (MW from 6 to 9 million).

Crosslinking Agent

The crosslinking agent was chromium acetate.

Formulations
    Formulation No. 1
        17.5 grams 254
        5 grams CrIII Acetate
        27.5 grams DE
    Formulation No. 2
        12 grams 254
        3 grams CrIII Acetate
        25 grams DE
    Formulation No. 1
        5 grams 935
        3 grams 254
        1.2 grams CrIII Acetate
        30.8 grams DE Filter Press Test This test was run to simulate the dewatering of the DE in a subterranean formation, and subsequent formation of a plug of DE and separate crosslinked polymer.

30 ml. of plain tap water was added to a beaker and subjected to mixing at 10,000 rpm in a Hamilton Beach commercial drink mixer with a solid agitator. To this blending water was added the above formulations (three separate runs). The sample was allowed to blend for 5 minutes at 10,000 rpm. After the 5 minutes of blending, this mixture was placed into the cylinder of a filter press in which substantial dewatering of the DE slurry occured without any pressure applied. Subsequently, 80 psi of pressure was applied to further dewater and consolidate the DE. Finally, heat was applied to the filter press to heat the consolidated DE and liquid run off. Both the filter press cylinder and collected run off (water soluble crosslinkable polymer and crosslinking agent-no visible DE) were placed into a 160 deg. F. water bath and allowed to crosslink. Without being limited in theory, applicant believes that residual polymer remaining in the DE after dewatering crosslinks and serves to promote the consolidation of the DE. Once crosslinked, the collected run off for all of the formulations promotes a rigid ringing gel.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

I claim:

1. A method of modifying a tubing/casing annulus plug fluid comprising:
(a) contacting the tubing/casing annulus plug fluid with a water soluble crosslinkable polymer, crosslinking agent, and filter aid to form a modified tubing/casing annulus plug fluid, wherein the filter aid is selected from the group consisting of diatomaceous earth, perlite, glass beads, magnesium silicate, solid thermoplastic or thermoset polymer beads, talc, and calcium silicate.

2. The method of claim 1, wherein the polymer is a carboxylate-containing polymer, and the crosslinking agent is selected from the group consisting of chromium (III) carboxylate complexes, aldehydes, dialdehydes, formaldehydes, glutaraldehyde, dichromates, titanium chelates, phenols, substituted phenols, ethers, aluminum citrate, and aluminates.

3. The method of claim 2, wherein the filter aid comprises at least one of diatomaceous earth or pearlite.

4. The method of claim 3, wherein the polymer comprises a low molecular weight polymer having a molecular weight less than 1,000,000, and a high molecular weight polymer having a molecular weight of at least 1,000,000.

5. The method of claim 3, wherein the polymer is a water soluble, carboxylate containing acrylamide, and the crosslinking agent is a chromium (III) carboxylate complex.

6. The method of claim 5, wherein the filter aid is diatomaceous earth.

7. The method of claim 5, wherein the filter aid is pearlite.

8. The method of claim 1, wherein the water soluble crosslinkable polymer, crosslinking agent, and filter aid, are all in solid form.

9. A method for plugging a tubing/casing annulus formed between a casing and a tube internal to the casing in a wellbore in fluid communication with a subterranean hydrocarbon-bearing formation, the method comprising:
(a) providing a tubing/casing annulus plug fluid comprising water soluble crosslinkable polymer, a crosslinking agent, and a filter aid;
(b) injecting the tubing/casing annulus plug fluid into the annulus; and
(c) dewatering the fluid to form a filter aid plug, and to form a dewatered fluid which subsequently crosslinks to substantial completion in said annulus to substantially plug said annulus,
wherein the filter aid is selected from the group consisting of diatomaceous earth, perlite, glass beads, magnesium silicate, solid thermoplastic or thermoset polymer beads, talc, and calcium silicate.

10. The method of claim 9, wherein the polymer is a carboxylate-containing polymer, and the crosslinking agent is selected from the group consisting of chromium (III) carboxylate complexes, aldehydes, dialdehydes, formaldehydes, glutaraldehyde, dichromates, titanium chelates, phenols, substituted phenols, ethers, aluminum citrate, and aluminates.

11. The method of claim 10, wherein the filter aid comprises at least one of diatomaceous earth or pearlite.

12. The method of claim 11, wherein the polymer comprises a low molecular weight polymer having a molecular weight less than 500,000, and a high molecular weight polymer having a molecular weight of at least 500,000.

13. The method of claim 11, wherein the polymer is a water soluble, carboxylate containing acrylamide, and the crosslinking agent is a chromium (III) carboxylate complex.

14. The method of claim 13, wherein the filter aid is diatomaceous earth.

15. The method of claim 13, wherein the filter aid is pearlite.

16. The method of claim 13, further comprising reinforcing material selected from the group consisting of hydrophilic fibers, hydrophobic fibers, and comminuted plant material.

17. A method for plugging a tubing/casing annulus formed between a casing and a tube internal to the casing in a wellbore in fluid communication with a subterranean hydrocarbon-bearing formation, the method comprising:
  (a) providing a tubing/casing annulus plug fluid comprising water soluble crosslinkable polymer, a crosslinking agent, and filter aid;
  (b) injecting the tubing/casing annulus plug fluid into the annulus; and
  (c) applying pressure to dewater the fluid to form a filter aid plug, and to form a dewatered fluid which subsequently crosslinks to substantial completion in said annulus to substantially plug said annulus,
wherein the filter aid is selected from the group consisting of diatomaceous earth, perlite, glass beads, magnesium silicate, solid thermoplastic or thermoset polymer beads, talc, and calcium silicate.

18. The method of claim 17, wherein the polymer is a carboxylate-containing polymer, and the crosslinking agent is selected from the group consisting of chromium (III) carboxylate complexes, aldehydes, dialdehydes, formaldehydes, glutaraldehyde, dichromates, titanium chelates, phenols, substituted phenols, ethers, aluminum citrate, and aluminates.

19. The method of claim 18, wherein the filter aid comprises at least one of diatomaceous earth or pearlite.

20. The method of claim 19, wherein the polymer comprises a low molecular weight polymer having a molecular weight less than 500,000, and a high molecular weight polymer having a molecular weight of at least 500,000.

21. The method of claim 19, wherein the polymer is a water soluble, carboxylate containing acrylamide, and the crosslinking agent is a chromium (III) carboxylate complex.

22. The method of claim 21, wherein the filter aid is diatomaceous earth.

23. The method of claim 21, wherein the filter aid is pearlite.

24. The method of claim 21, further comprising reinforcing material selected from the group consisting of hydrophilic fibers, hydrophobic fibers, and comminuted plant material.

25. A method of circulating a tubing/casing annulus plug fluid in a welbore penetrating a subterranean formation, comprising:
  (a) providing a tubing/casing annulus plug fluid comprising water or an aqueous solution, water soluble crosslinkable polymer, a crosslinking agent, and a filter aid;
  (b) circulating the tubing/casing annulus plug fluid in the wellbore
wherein the filter aid is selected from the group consisting of diatomaceous earth, perlite, glass beads, magnesium silicate, solid thermoplastic or thermoset polymer beads, talc, and calcium silicate.

26. The method of claim 25, wherein the polymer is a carboxylate-containing polymer, and the crosslinking agent is selected from the group consisting of chromium (III) carboxylate complexes, aldehydes, dialdehydes, formaldehydes, glutaraldehyde, dichromates, titanium chelates, phenols, substituted phenols, ethers, aluminum citrate, and aluminates.

27. The method of claim 26, wherein the filter aid comprises at least one of diatomaceous earth or pearlite.

28. The method of claim 27, wherein the polymer comprises a low molecular weight polymer having a molecular weight less than 500,000, and a high molecular weight polymer having a molecular weight of at least 500,000.

29. The method of claim 27, wherein the polymer is a water soluble, carboxylate containing acrylamide, and the crosslinking agent is a chromium (III) carboxylate complex.

30. The method of claim 29, wherein the filter aid is diatomaceous earth.

31. The method of claim 29, wherein the filter aid is pearlite.

32. The method of claim 29, further comprising reinforcing material selected from the group consisting of hydrophilic fibers, hydrophobic fibers, and comminuted plant material.

33. A method of modifying a tubing/casing annulus plug fluid circulating in a wellbore penetrating a subterranean formation, comprising:
  (a) introducing a water soluble crosslinkable polymer, crosslinking agent, and filter aid to the circulating tubing/casing annulus plug fluid
  wherein the filter aid is selected from the group consisting of diatomaceous earth, perlite, glass beads, magnesium silicate, solid thermoplastic or thermoset polymer beads, talc, and calcium silicate.

34. The method of claim 33, wherein the polymer is a carboxylate-containing polymer, and the crosslinking agent is selected from the group consisting of chromium (III) carboxylate complexes, aldehydes, dialdehydes, formaldehydes, glutaraldehyde, dichromates, titanium chelates, phenols, substituted phenols, ethers, aluminum citrate, and aluminates.

35. The method of claim 34, wherein the filter aid comprises at least one of diatomaceous earth or pearlite.

36. The method of claim 35, wherein the polymer comprises a low molecular weight polymer having a molecular weight less than 500,000, and a high molecular weight polymer having a molecular weight of at least 500,000.

37. The method of claim 35, wherein the polymer is a water soluble, carboxylate containing acrylamide, and the crosslinking agent is a chromium (III) carboxylate complex.

38. The method of claim 37, wherein the filter aid is diatomaceous earth.

39. The method of claim 37, wherein the filter aid is pearlite.

40. The method of claim 33, wherein the water soluble crosslinkable polymer, crosslinking agent, and filter aid, are all in solid form.

* * * * *